United States Patent [19]

Taylor

[11] Patent Number: 4,567,494

[45] Date of Patent: Jan. 28, 1986

[54] NOZZLE CLEANING, PRIMING AND CAPPING APPARATUS FOR THERMAL INK JET PRINTERS

[75] Inventor: Bret K. Taylor, Vancouver, Wash.

[73] Assignee: Hewlett-Packard Company, Palo Alto, Calif.

[21] Appl. No.: 626,000

[22] Filed: Jun. 29, 1984

[51] Int. Cl.[4] ........................................ G01D 15/18

[52] U.S. Cl. ........................................ 346/140 R

[58] Field of Search ........................................ 346/140 R, 75

[56] References Cited

U.S. PATENT DOCUMENTS 4,177,471 12/1979 Mitchell ........................ 346/140
4,364,065 12/1982 Yamamori ........................ 346/140
4,394,669 7/1983 Ozawa ........................ 346/140
4,410,900 10/1983 Terasawa ........................ 346/140

*Primary Examiner*—Joseph W. Hartary
*Attorney, Agent, or Firm*—Leslie G. Murray; William J. Bethurum; William H. MacAllister

[57] ABSTRACT

Cleaning and priming of ink-ejecting nozzles is achieved by engaging the nozzles with an elastomeric suction cup as the printhead moves to the beginning or ending of a print line. The suction cup contains an inner cup of foam which wipes off any residual ink droplets. The cup assembly is connected to a vacuum pump for drawing ink out of the nozzles. The assembly is mounted on a four-bar linkage which, as it rotates, lifts the cup assembly to engage the nozzles in the printhead.

4 Claims, 7 Drawing Figures

NOZZLE CLEANING, PRIMING AND CAPPING APPARATUS FOR THERMAL INK JET PRINTERS

BACKGROUND OF THE INVENTION

The present invention relates to printers of the type in which characters are formed by means of tiny droplets of ink which are electronically caused to impinge directly on a recording medium (paper). More particularly, the present invention relates to an ink jet printing system in which ink droplets are expelled on demand from one or more nozzles by an electronically controllable mechanical force.

The rapidity of modern day data processing imposes severe demands on the ability to produce a printed record at very high speed. At the same time, the modern office environment places a high degree of importance on the need for a quiet printing operation. The thermal ink jet printer admirably meets these requirements. In the co-pending patent application of John L. Vaught, et al, entitled "Thermal Ink Jet Printer," Ser. No. 415,290 filed Sept. 7, 1982, now U.S. Pat. No. 4,490,728, and assigned to the instant assignee, a printing system is described which utilizes an ink-containing capillary having an orifice from which ink is ejected in the form of a tiny droplet. Ejection is caused by an ink-heating mechanism in the form of a thermal resistor located within the capillary and adjacent to its orifice. Upon the application of a suitable current to the resistor, the resistor is rapidly heated. A significant amount of thermal energy is transferred to the ink in the capillary resulting in the vaporization of a small portion of the ink adjacent to the orifice and producing a bubble in the capillary. The formation of this bubble in turn creates a pressure wave which propels a single ink droplet from the orifice and onto a nearby writing surface. By properly selecting the location of the ink-heating mechanism with respect to the orifice and with careful control of the energy transfer from the heating mechanism to the ink, the ink bubble will quickly collapse on or near the ink-heating mechanism before any vapor escapes from the orifice.

It will be appreciated that ink, by its nature, is a medium which is intended to dry relatively rapidly. This being so, it will be further appreciated that clogging of the tiny orifices in the print heat of a thermal ink jet printer is apt to occur, especially when one considers that the print heat contains a heat source, the heat from which can accelerate the evaporation of solvents containing ink pigments, often leaving behind a crust of solid ink particles. It will also be understood that capillary structures often require a "priming" action in order to initiate and maintain a continuous flow of ink into the capillary, much like a pump requires priming. The replacement of the ink supply, once it is depleted, likewise will require re-priming. Finally, the small orifices in the print head are subject to contamination by "dirt," which is usually in the form of extremely small dust particles from the adjacent recording medium. Almost all paper products, for example, have an accumulation or residue of fine paper particles or dust on them. Any one of the foregoing factors may cause an interruption of the supply of ink to the orifice or prevent the ejection of an ink drop therefrom.

In the co-pending application of Ross. R. Allen entitled "A Self-Cleaning Ink Jet Drop Generator having Cross Talk Reduction Features," Ser. No. 444,108 filed Nov. 24, 1982 and assigned to the instant assignee, a thermal ink jet printhead is disclosed in which the orifice plate is provided with a plurality of drain holes adjacent to the ink-ejecting orifices for the purpose of draining off any accumulations of ink on the outer surface of the orifice plate. Allen also mentions other methods for cleaning this surface, such as blowing away ink drops by air jets, wiping the surface of rolling an absorbent roller across the surface. These methods are characterized by Allen as requiring additional mechanisms or being intermittent in operation or being a source of contamination themselves, especially in the case of wipers or rollers. Intermittent operation is said to allow excess ink to accumulate and allowing residues to form.

Various other ways have been proposed to clean the surface of the member or plate containing the orifices from which ink is ejected usually by providing means such as shields or wipers for wiping such surface and/or flushing the orifices. Typical of these techniques are those disclosed in U.S. Pat. Nos. 4,112,435 to Kattner et al.; 4,177,471 to Mitchell; and 4,371,881 to Bork et al. In this latter patent an elastic closure plate, mounted on the inside of a protective cap or shield secured to the printhead carriage, is moved over the orifice during periods of non-use. For flushing, the closure plate is moved away from the orifice by partially rotating the entire cap assembly and ink, released by means of a pressure burst in the ink supply system, is conducted away from the writing head by means of the enclosing shield or cap against the inside of which the ink impinges. A resilient wiper blade is also provided on the inside of the cap/shield member adjacent the elastic closure plate. As the cap/shield member is partially rotated the wiper element sweeps over the jet openings to sweep away any dirt or unwanted debris. The Kattner patent discloses a combination protective shield and cleaning wiper mounted on a printhead which is movable to and from a blocking position in front of the orifices, the wiper blade or arm wiping the orifice face during movement between positions. The Mitchell patent discloses a cap member of urethane plastic for engagement with his printhead to form a seal therewith when the printhead is moved toward the cap member by a cam arrangement. The housing for the cap member also includes a doctor's blade and a pad wet with glycerine to clean and wipe any ink off the cap member itself. Also provided is a purge needle to remove ink flushed through the orifices, this needle being located in front and to the side of the cap and being connected to a purge pump.

SUMMARY OF THE INVENTION

The present invention provides means and methods for rapidly cleaning and priming a plurality of ink-ejecting nozzles in an array. The present invention achieves its ends by moving the printhead apparatus at the end of each line of printing from the "print" position to a "clean and prime" position. At this position the printhead nozzles are engaged by an elastomeric suction cup which contains within itself a second cup of a foam or sponge-like material. The cup assembly is mounted on a carriage member which is supported on and by a four-bar linkage mechanism which, upon rotation, lifts the carriage assembly up so that the two cups firmly engage the surface of the printhead plate containing the ink jet nozzles or orifices while maintaining the cups in a substantially level attitude and parallel to the plate of the orifice plate. In this position the foam cup is compressed between the printhead and the outer cup so that the foam cup is actually pushed down within the outer cup with its upper edge only being in engagement with the printhead. Rotation of the four-bar linkage is accomplished by movement of the printhead at the end of a line of printing. The printhead engages a post or stop on the carriage member causing it to travel with the printhead. The cup assembly is connected by appropriate tubing to a pump so that when the elastomeric outer cup makes airtight contact to the nozzle plate of the printhead, a vacuum is established ("pulled") within the elastomeric cup so as to draw or suck ink from the orifices into the cup. The inner foam cup acts as a wick to enhance the retention of the ink and to draw away from the rim of the elastomeric outer cup so that little or none of the ink in the cup assembly remains as drops on or is smeared across the orifice plate. At the limit of travel of the printhead a switch may be engaged to cause an indication that the printhead is in the capped position and is ready for priming. The printhead, of course, is independently operated and controlled to move right and left.

BRIEF DESCRIPTION OF DRAWINGS

The invention will be described hereinafter in greater detail by reference to the drawings in which.

DETAILED DESCRIPTION OF THE INVENTION

Figure 1:
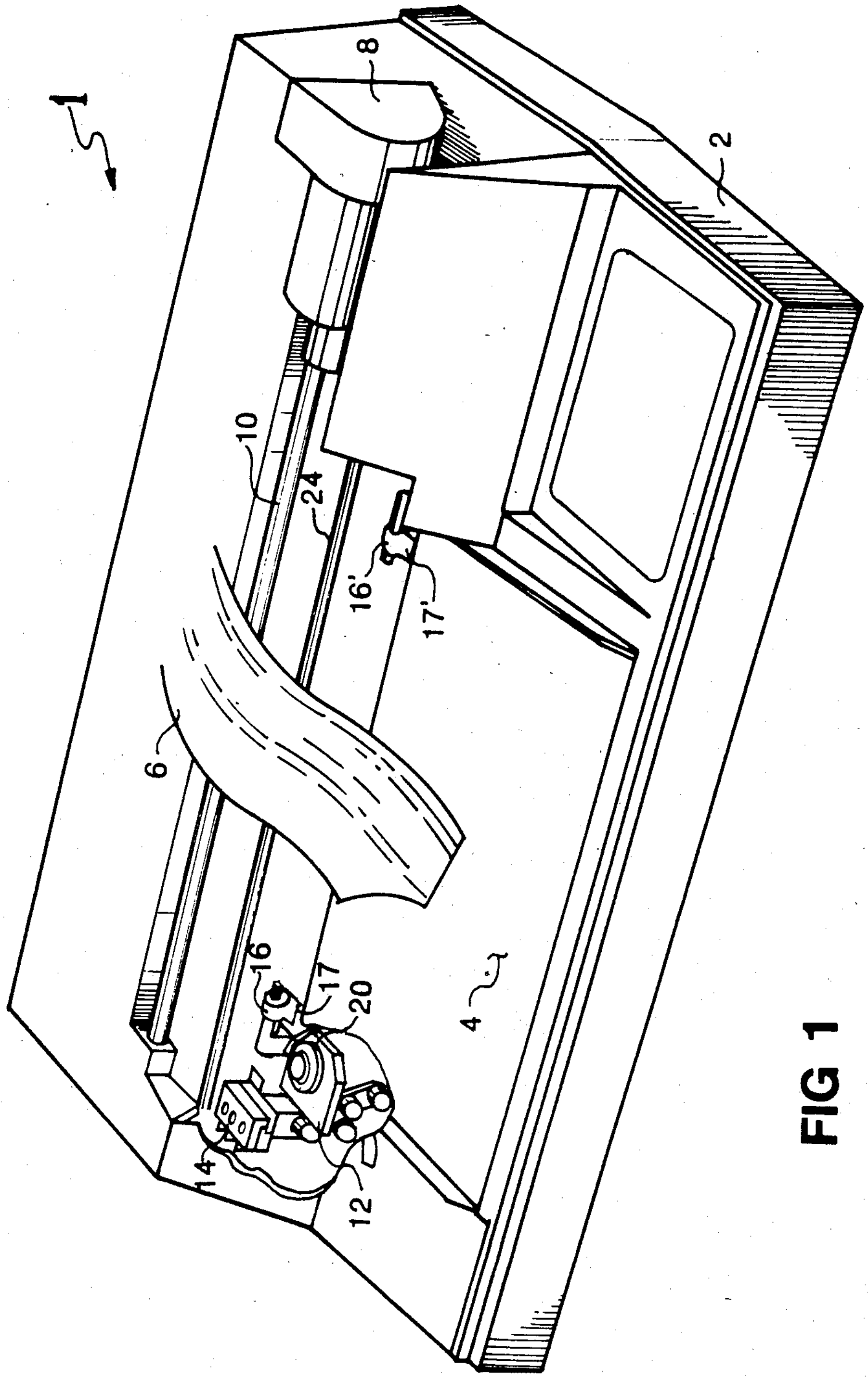
FIG. 1 is an isometric view of an ink jet printer embodying the cleaning and priming apparatus of the invention.

Referring now to the drawings and to FIG. 1 in particular, there is shown a printing apparatus 1 in which the cleaning and priming apparatus of the invention may be employed to advantage. The ink jet printer of the invention includes a printer support frame member 2 on which is mounted and/or affixed the various components of the printer. Omitted from this view for the purpose of clarity in illustration is the printhead itself which is normally attached to the end of the flexible circuit or flat cable connector 6 for supplying electrical signals thereto for the purpose of controlling the printing operation of the printhead. The printhead may be of the thermal ink jet type in which an orifice plate is provided and has associated with each orifice a thermal resistor. Each resistor is adapted to be selectively energized by electrical current resulting in the heating of a small portion of the ink lying between the orifice and the resistor so as to cause the expulsion of the ink from the orifice. It will be understood that there may be a plurality of orifices in such an orifice plate each having its own independently controllable resistor. In the particular printer shown herein the printhead is adapted to move across a medium or paper with its orifice plate facing downwardly toward the surface of the horizontally disposed paper. Thus, ejected ink is expelled in a downward direction to impinge upon the paper therebeneath. The paper (not shown) moves in a direction from the front of the printer to the back thereof across the support surface or plate 4 by means of the pinch and paper feed rollers 16, 17 and 16', 17' which are driven by a motor 8. It will be understood that the paper is advanced by the motor a line at a time in a direction at right angles to the scanning direction of the printhead itself. Thus the printhead will move reciprocally from right to left to accomplish printing across the paper. The printer 1 includes a carriage 12 (hereinafter referred to as the primer carriage) which supports and carries the priming and cleaning assembly 20 of the invention. Adjacent the primer carriage 12 is a limit switch 14 which when engaged by the printhead as it moves from right to left causes a signal to be initiated indicating that the printhead is capped.

Figure 2A:
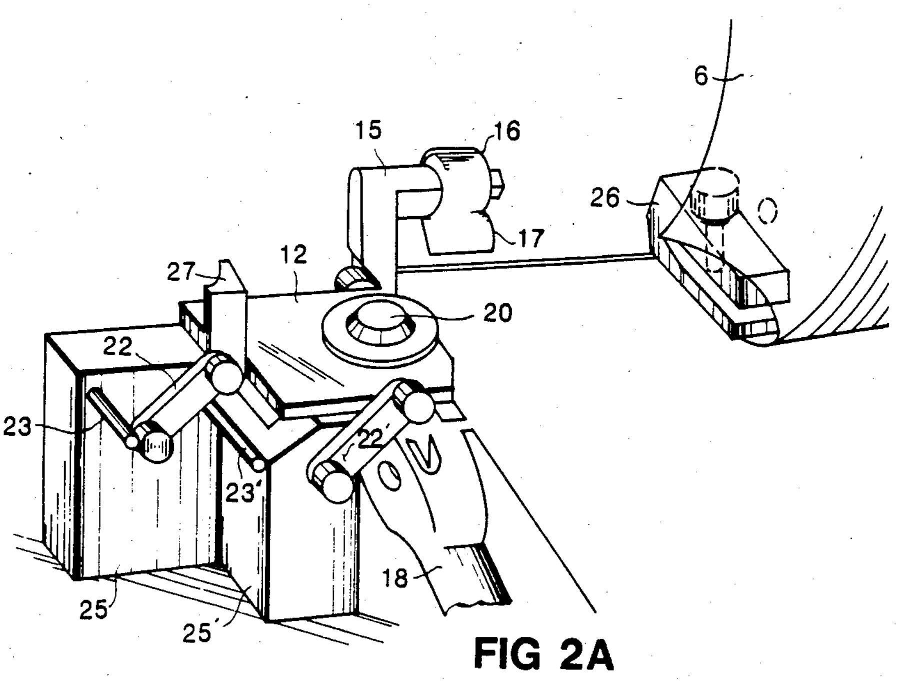
FIG. 2A is an isometric view of a portion of an ink jet printer showing the cleaning and priming apparatus of the invention in a first position thereof.
Figure 2B:
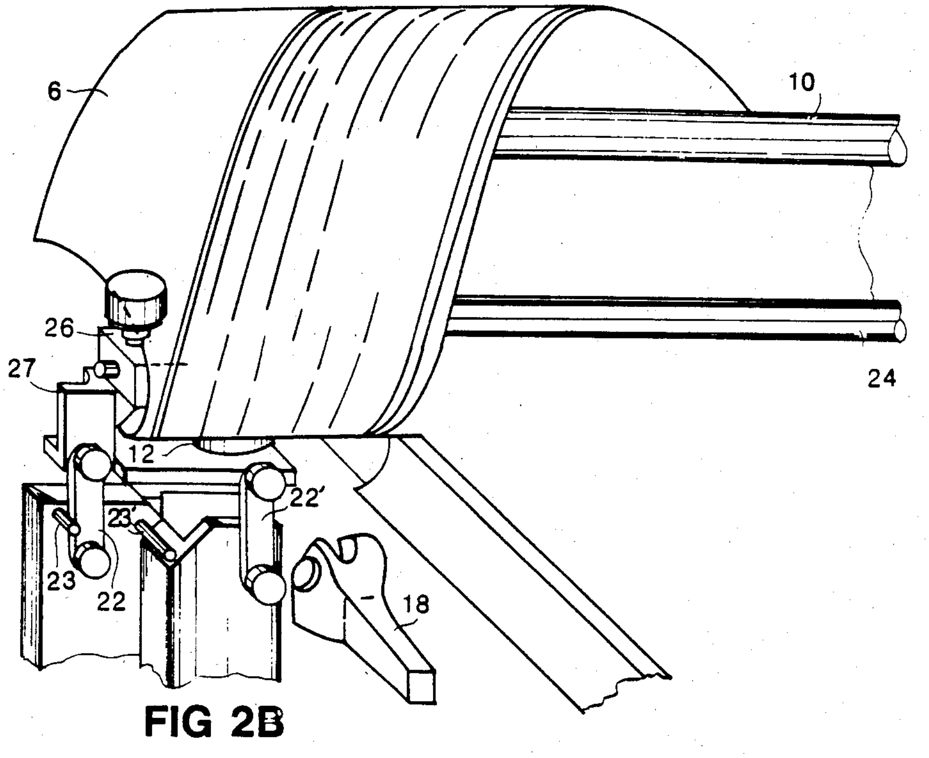
FIG. 2B is an isometric view of a portion of ink jet printer showing the cleaning and priming apparatus of the invention in a second position thereof in engagement with the printhead surface.

Referring now to FIG. 2A, the printhead 26 is shown as it is moving from right to left toward the priming-cleaning assembly 20 which will be described in greater detail hereinafter. Also shown is a paper pinch roller 16 mounted on a roller support arm 15 and in engagement with a paper feed roller 17. The priming and cleaning assembly 20 is disposed on the primer carriage 12 which in turn is supported by a four-bar linkage assembly comprising a pair of arms 22, 22' having their upper ends pivotedly connected to the primer carriage 12. The lower ends of the arms 22, 22' are likewise pivotedly secured to a support frame structure 25, 25'. The primer carriage 12 is also provided with a vertical extension 27 which functions to be engaged by the printhead 26 as it moves from right to left. Extending outwardly from the side walls of the support frame structure 25, 25' are a pair of rods 23, 23' which acts as stops for the movement of the pantagraph arms 22, 22'. Also shown in this figure is a lever 18 which engages the end of the pinch roller support rod 15 so as to permit the roller 16 to be raised or lowered for engagement or disengagement with the feed roller 17 for inserting or releasing paper therebetween. The primer carriage 12 and the pantagraph arm assembly 22, 22' are shown in a first position thereof prior to engagement with the printhead 26. Movement of the printhead 26 toward the primer carriage 12 ultimately results in the engagement of the printhead with the stop 27 affixed to the primer carriage 12. Continued movement of the printhead results in moving the primer carriage 12 and the panagraph arm assembly 22, 22' in the same direction. At the same time such movement also results in vertical movement of the primer carriage upwardly for engagement with the orifice plate on the bottom surface of the printhead 26. Movement of the primer carriage 12 from right to left will continue until the pantagraph arms 22, 22' engage the pantagraph stop bars 23, 23' not only at which time, the printhead also engages the limit switch 14 for purposes explained hereinbefore. The final position of the printhead 26 and the primer carriage 12 is that shown in FIG. 2B. Also shown in this FIG. 2B are rods 10 and 24 on which the printhead itself is carried and is moved. The right-left movement of the printhead is accomplished by a pulley cord arrangement not shown in these drawings for the purpose of clarity.

Figure 3:
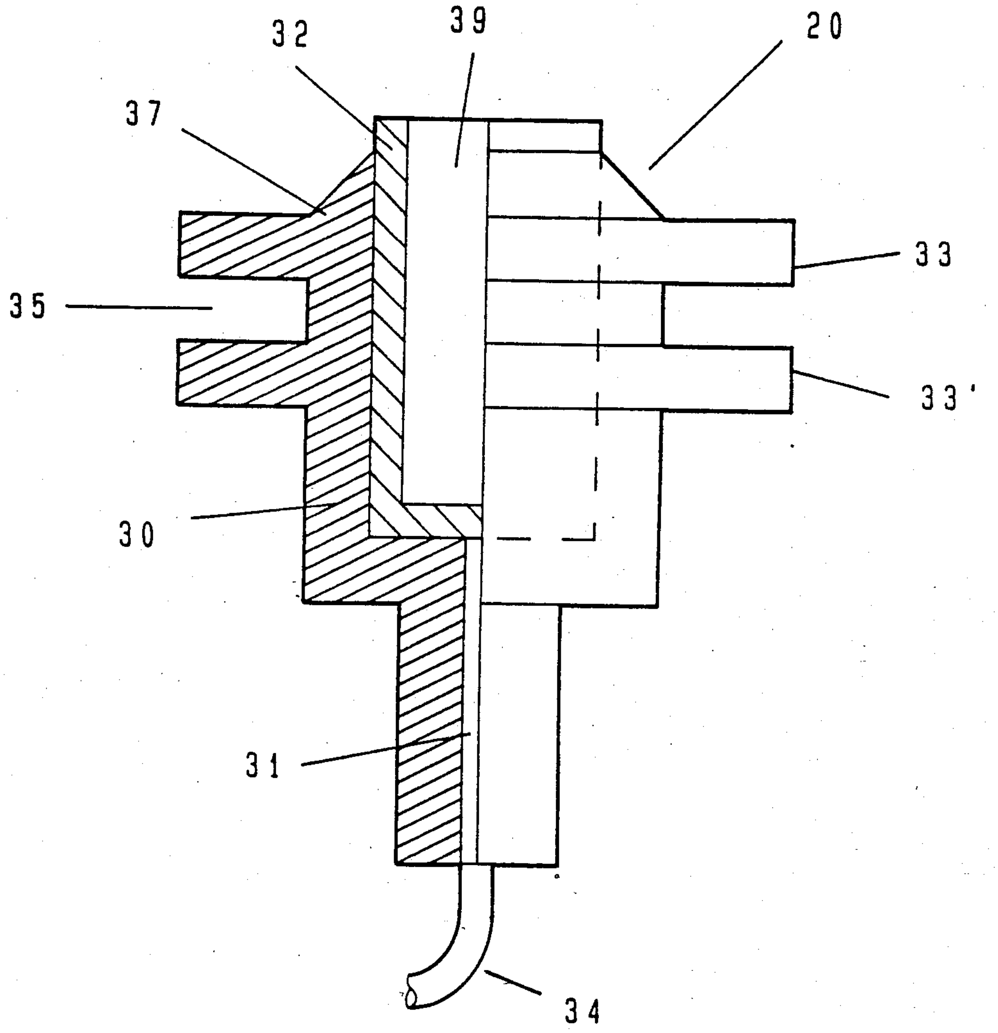
FIG. 3 is a side view, partly in section, of the priming and wicking cup apparatus of the invention.

Referring now to FIG. 3, there is shown a suction cup 30 for use in the cleaning and priming assembly 20 of the invention. The cup 30 is essentially a hollow cylindrical member having a drain pipe 31 leading out of the bottom of the cup portion for connection to an ink suction tube 34. The cup is provided with a pair of ring flanges 33, 33′ forming a circular slot 35 therebetween for the purpose of mounting and securing the cup 30 into the primer carriage 12. The cup 30 may be made of any elastomeric material such as silicone rubber having sufficient resilience and rigidity to engage the orifice plate of the printhead without damaging the same and yet be capable of forming an airtight seal therewith. To facilitate such engagement the upper internal diameter portion of the cup is provided with a tapered extension 37. Positioned within the hollow or open portion 39 of the cup is a second cup 32 formed of a foam-like material such as cellulose sponge or polyurethane foam or even felt. The principal requirement for the inner cup 32 is that it be porous and capable of wicking ink along its length toward the bottom of the cup assembly so that ink collected at the surface of the orifice plate by the inner cup 32 is wicked downwards and is removed by the drain pipe 31 and the suction tube 34. The hollow center portion 39 of the two-cup assembly allows paper dust and other particles that may be present on the printhead surface to be washed away from the orifices. The bottom of the foam cup 32 not only holds the foam cup in place but it also prevents the foam from saturating since as soon as it begins to saturate, the suction tube 34 will pull the ink out of the foam cup 32 by vacuum. The characteristics of the two-cup assembly are such as to provide an airtight seal when in engagement with the orifice plate of the printhead structure, to possess sufficient springiness to allow a good seal even with large variations in tolerance, and to provide sufficient force to hold the printhead in the overcentered position with the power off, and to provide a very narrow line of contact with the printhead to minimize the quantity of ink that might be left on the printhead after disengagement.

Figure 4:
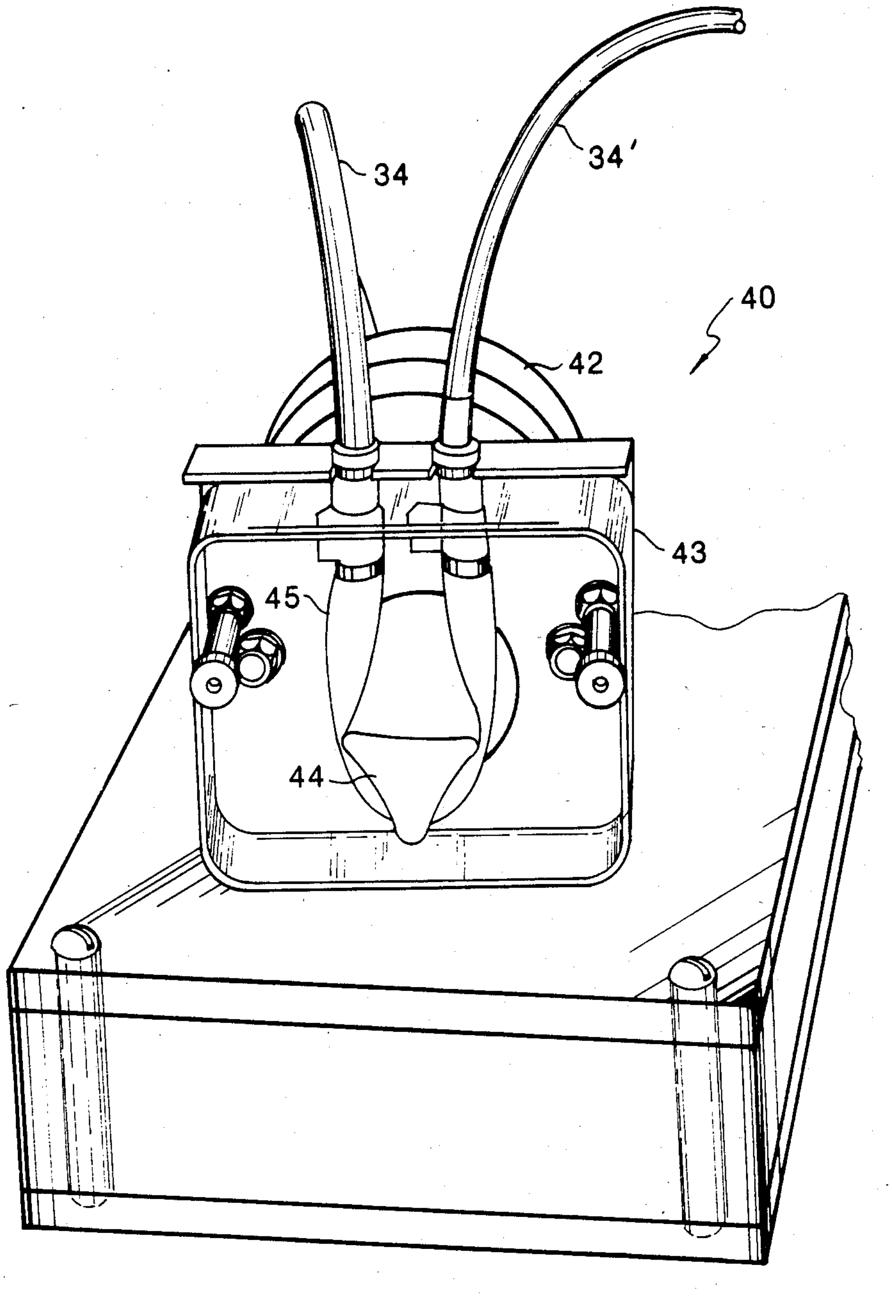
FIG. 4 is an isometric view of a peristaltic pump apparatus for use with the cleaning and priming apparatus of the invention.
Figure 5C:
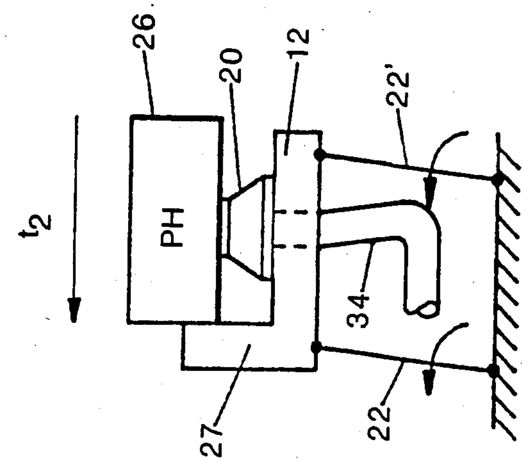
FIG. 5 is a schematic depicting the various motions and positions of the cleaning and priming apparatus of the invention during operation thereof.
Figure 5B:
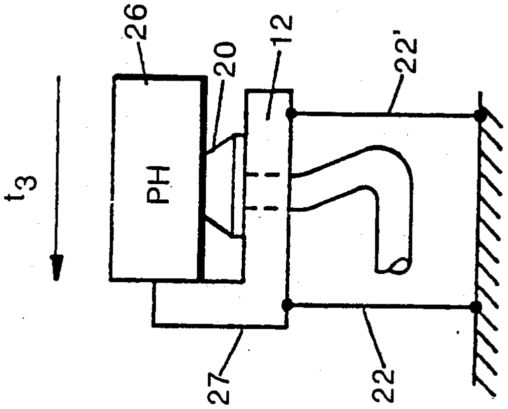
Figure 5A:
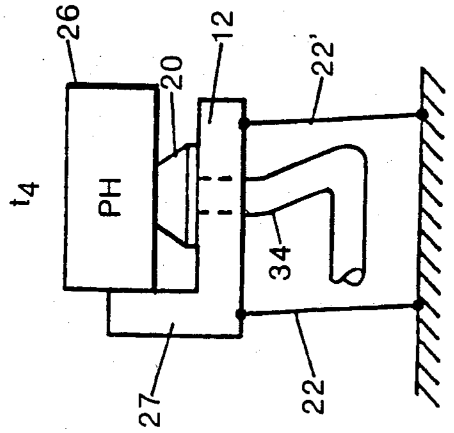
Figure 5D:
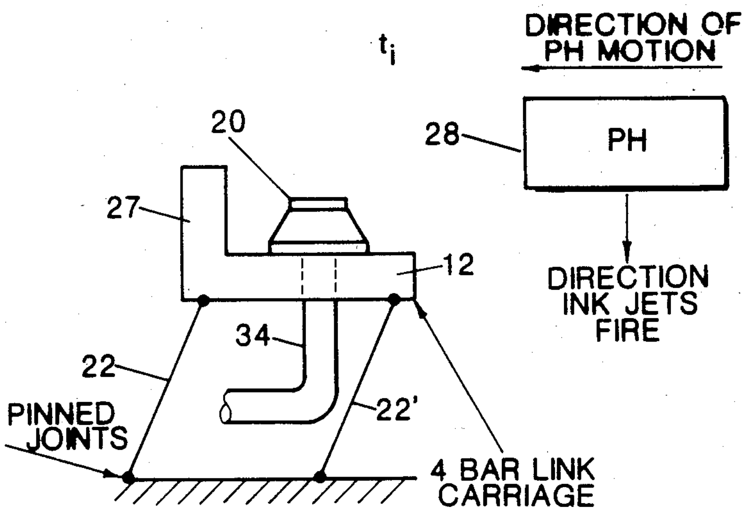

Referring now to FIG. 4 there is shown a suitable pump which may be of the peristaltic type for providing suction to the two-cup assembly 30, 32 so as to remove ink from this assembly. Such a peristaltic pump may include a rotary motor 42 affixed to a rectangular mount or protective cover 43. Mounted on the shaft of the motor 42 is a triangular member 44. The suction tube 34 is connected to a pump tube 45 within the protective cover 43, the pump tube 45 passing around the triangular member 44 with the outlet end thereof being connected to a discharge tube 34′. It will be understood that as the triangular member 44 rotates, its apices will successively engage and squeeze discrete portions of the pump tube 45 so as to force any ink contained therein to be driven around with the triangular member 44 for eventual discharge into the discharge line 34′.

Referring now to FIG. 5 the operations of the printhead and the cleaing and priming assembly are schematically depicted. Initially, the primer carriage 12 carrying the cup assembly 20 is positioned to the extreme right of its travel extent as indicated at time $t_1$. At the time, $t_2$, the printhead 26 has moved from right to left toward the cup assembly 20 and is in contact with the vertical extension 27 of the primer carriage 12. As the printhead 26 continues to move from right to left it causes the primer carriage 12 to move in the same direction; because of the pantagraph arrangement of the pivot arms 22, 22′ on which the carriage 12 is supported, the carriage 12 is also caused to move upwardly so that the cup assembly 20 contacts the orifice plate in airtight relation which is the condition at time, $t_3$. At the same time suction is applied to the orifice plate of the printhead 26 so as to suck ink down from the printhead into the cup assembly 20 for eventual removal and discharge. Continued movement of the printhead 12 from right to left carries the primer carriage 12 with it to the position indicated at time, $t_4$ where because of the pantagraph arrangement of the support arms 22, 22′ of the primer carriage 12, the primer carriage moves slightly downwardly into a stable or static capped position in engagement with the printhead for transporting the printer and for limiting evaporation of ink from the printhead during periods of non-use. When the suction tube 34 attempts to return to its initial position a very small spring force is exerted by the suction tube 34. This in turn forces the primer carriage 12 to the right, its initial position. In the capped position this small spring force is not sufficient in itself to re-compress the suction cup assembly 20 to move the primer carriage 12 and the printhead 26. When the printhead 26, however, has moved to the right and out of contact with the cup assembly 20, this force is sufficient to reutn the primer carriage to the right and its inital position (See FIG. 2B and FIG. 5, $t_1$). The printhead 26 is then moved in a left to right direction to either print the next line while moving in this direction or to return to the extreme right hand side to begin the printing of a new line by moving from right to left. The return travel of the printhead 26 to its extreme right position is initiated by the command electronic controller for the printer. The motor 8 for moving the printhead exerts a force from left to right on the printhead 26, allowing the weak spring force exerted by the suction tube 34 on the primer carriage to return it to its initial position for reengagement with the printhead upon its next return. During the time when the printhead 26 is not in engagement with the outer cup 37 but is still engaged with the inner cup 32, the peristaltic pump 44 continues to operate, pulling air and ink out of the cup assembly thus assuring that the foam sponge of the inner cup 32 has a number of empty cells for ink to "wick" toward.

Figure 6:
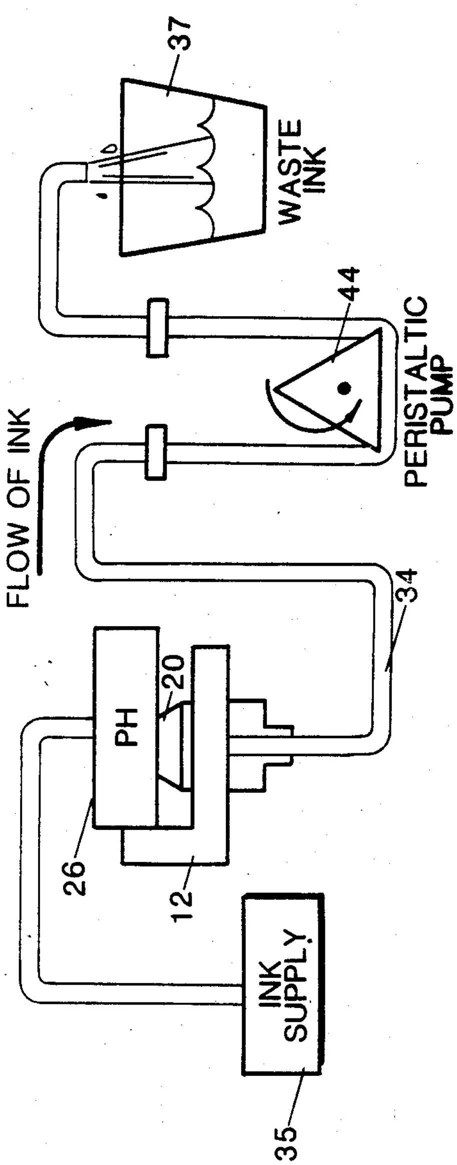
FIG. 6 is a schematic depicting the ink flow path system for use with the cleaning and priming apparatus of the invention.

Referring now to FIG. 6 ink is delivered to the printhead 26 from a supply 35 by means of a tube. When the printhead 26 is in engagement with the cup assembly 20 on the primer carriage 12 suction or vacuum is applied to the cup assembly 20 by the peristaltic pump 44 and the tube 34 so as to draw ink through the printhead and its orifices into the cup assembly from whence it is eventually drawn into the tube 34 and thereafter discharged by the peristaltic pump 44 into a waste ink collector 37.

There thus has been shown and described a novel and useful priming and cleaning apparaus for ink jet printers which cleans ink-ejecting orifices and associated ink supply channels by a purging system and cleanly disposes of the ink. The priming, cleaning and capping apparatus of the invention is relatively simple in structure and operation, and is completely automatic.

What is claimed is:

1. Ink jet printing apparatus comprising:

(A) a printhead including an ink-ejecting orifice plate, said printhead being adapted to move in a predetermined direction;

(B) a suction cup assembly;

(C) a carriage member for said cup assembly;

(D) a pantograph-like linkage assembly connected to and supporting said carriage member whereby upon engagement of said carriage member by said printhead, said carriage member is moved by said printhead in said predetermined direction and in a direction toward said printhead by said linkage assembly to bring said cup assembly into contact with said orifice plate;

(E) and vacuum means connected to said cup assembly for sucking ink from said orifice plate into said cup assembly.

2. The invention according to claim 1 wherein said suction cup assembly comprises a first cup member containing a second cup member of porous material.

3. The invention according to claim 2 wherein said second cup member extends above said first cup member by a predetermined amount.

4. Ink jet printing apparatus comprising:

(A) a printhead including an ink-ejecting orifice plate, said printhead being adapted to move in a predetermined direction;

(B) a suction cup assembly;

(C) a carriage member for said cup assembly;

(D) a linkage assembly comprising a plurality of parallel bars each having one end thereof pivotally connected to said carriage member with the opposite ends thereof being privotally connected to a fixed base member;

(1) said parallel bars being adapted to move in said predetermined direction;

(E) and vacuum means connected to said cup assembly for sucking ink from said orifice plate into said cup assembly.

* * * * *